United States Patent
Sengupta et al.

(10) Patent No.: US 11,522,744 B2
(45) Date of Patent: Dec. 6, 2022

(54) REFERENCE SIGNAL DESIGN FOR CELLULAR BROADCAST

(71) Applicant: QUALCOMM Incorporated, San Diego, CA (US)

(72) Inventors: Ayan Sengupta, San Diego, CA (US); Alberto Rico Alvarino, San Diego, CA (US); Arash Mirbagheri, San Diego, CA (US); Chu-Hsiang Huang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 80 days.

(21) Appl. No.: 16/922,586

(22) Filed: Jul. 7, 2020

(65) Prior Publication Data
US 2021/0014096 A1   Jan. 14, 2021

Related U.S. Application Data

(60) Provisional application No. 62/873,658, filed on Jul. 12, 2019.

(51) Int. Cl.
*H04L 27/26* (2006.01)
*H04L 5/00* (2006.01)

(52) U.S. Cl.
CPC ........ *H04L 27/2613* (2013.01); *H04L 5/0007* (2013.01); *H04L 5/0048* (2013.01)

(58) Field of Classification Search
CPC ... H04L 5/0007; H04L 5/0044; H04L 5/0048; H04L 5/0053; H04L 5/0094;
(Continued)

(56) References Cited

U.S. PATENT DOCUMENTS

2012/0093101 A1\* 4/2012 Dai .................. H04L 5/005
                                                    370/329
2017/0048820 A1    2/2017 Wang et al.
(Continued)

FOREIGN PATENT DOCUMENTS

WO    WO-2018085660 A1 \*  5/2018  .......... H04W 72/005

OTHER PUBLICATIONS

Ebu., et al., "Scenarios and Simulation Assumptions for the LTE Based Terrestrial Broadcast Gap Analysis", GPP Draft, R1-1811588, Chengdu, China Oct. 8-12, 2018, 3rd Generation Partnership Project (3GPP), Mobile Competence Centre, 650. Route Des Lucioles, F-06921 Sophia-Antipolis Cedex, France, vol. RAN WG1, No. Chengdu, China, Oct. 8, 2018-Oct. 12, 2018, Sep. 28, 2018 (Sep. 28, 2018), XP051518986, 7 Pages, Retrieved from the Internet: URL:http://www.3gpp.org/ftp/tsg%5Fran/WG1%5FRL1/TSGR1%5F94b/Docs/R1%2D1811588%2Ezip.
(Continued)

*Primary Examiner* — David B Lugo
(74) *Attorney, Agent, or Firm* — Harrity & Harrity, LLP

(57) ABSTRACT

Various aspects of the present disclosure generally relate to wireless communication. In some aspects, a user equipment (UE) may determine a set of resources, in a set of physical multicast channel symbols, for receiving a first type of reference signal and a second type of reference signal. The UE may receive one or more reference signal transmissions in accordance with the set of resources. Numerous other aspects are provided.

30 Claims, 10 Drawing Sheets

(58) Field of Classification Search
CPC ............. H04L 25/0204; H04L 25/0226; H04L 27/261; H04L 27/2613; H04L 27/2659
See application file for complete search history.

(56) References Cited

U.S. PATENT DOCUMENTS

| | | | |
|---|---|---|---|
| 2017/0070312 A1* | 3/2017 | Yi | ......................... H04J 11/0069 |
| 2017/0171842 A1* | 6/2017 | You | ...................... H04L 27/2602 |
| 2017/0208588 A1 | 7/2017 | Park et al. | |
| 2019/0372617 A1* | 12/2019 | Chen | ..................... H04L 5/0007 |
| 2020/0028642 A1* | 1/2020 | He | ...................... H04W 72/044 |
| 2020/0029309 A1* | 1/2020 | Zhang | ................. H04W 72/042 |
| 2020/0351923 A1* | 11/2020 | Karaki | .................. H04L 5/0094 |
| 2021/0288771 A1* | 9/2021 | Kim | ......................... H04L 5/00 |

OTHER PUBLICATIONS

International Search Report and Written Opinion—PCT/US2020/041129—ISA/EPO—dated Oct. 9, 2020.

* cited by examiner

REFERENCE SIGNAL DESIGN FOR CELLULAR BROADCAST

CROSS-REFERENCE TO RELATED APPLICATION

This patent application claims priority to U.S. Provisional Patent Application No. 62/873,658, filed on Jul. 12, 2019, entitled "REFERENCE SIGNAL DESIGN FOR CELLULAR BROADCAST," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for reference signal transmission and reception using a reference signal design for cellular broadcast.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a set of resources, in a set of physical multicast channel symbols between a first cell acquisition subframe and a second cell acquisition subframe, for receiving a first type of reference signal and a second type of reference signal, wherein the first type of reference signal is for channel estimation and the second type of reference signal is for channel estimation and carrier frequency offset estimation, and receiving one or more reference signal transmissions in accordance with the set of resources.

In some aspects, a UE for wireless communication may include memory and one or more processors operatively coupled to the memory. The memory and the one or more processors may be configured to determine a set of resources, in a set of physical multicast channel symbols between a first cell acquisition subframe and a second cell acquisition subframe, for receiving a first type of reference signal and a second type of reference signal, wherein the first type of reference signal is for channel estimation and the second type of reference signal is for channel estimation and carrier frequency offset estimation, and receive one or more reference signal transmissions in accordance with the set of resources.

In some aspects, a non-transitory computer-readable medium may store one or more instructions for wireless communication. The one or more instructions, when executed by one or more processors of a UE, may cause the one or more processors to determine a set of resources, in a set of physical multicast channel symbols between a first cell acquisition subframe and a second cell acquisition subframe, for receiving a first type of reference signal and a second type of reference signal, wherein the first type of reference signal is for channel estimation and the second type of reference signal is for channel estimation and carrier frequency offset estimation, and receive one or more reference signal transmissions in accordance with the set of resources.

In some aspects, an apparatus for wireless communication may include means for determining a set of resources, in a set of physical multicast channel symbols between a first cell acquisition subframe and a second cell acquisition subframe, for receiving a first type of reference signal and a second type of reference signal, wherein the first type of reference signal is for channel estimation and the second type of reference signal is for channel estimation and carrier frequency offset estimation, and means for receiving one or more reference signal transmissions in accordance with the set of resources.

Aspects generally include a method, apparatus, system, computer program product, non-transitory computer-readable medium, user equipment, base station, wireless communication device, and/or processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
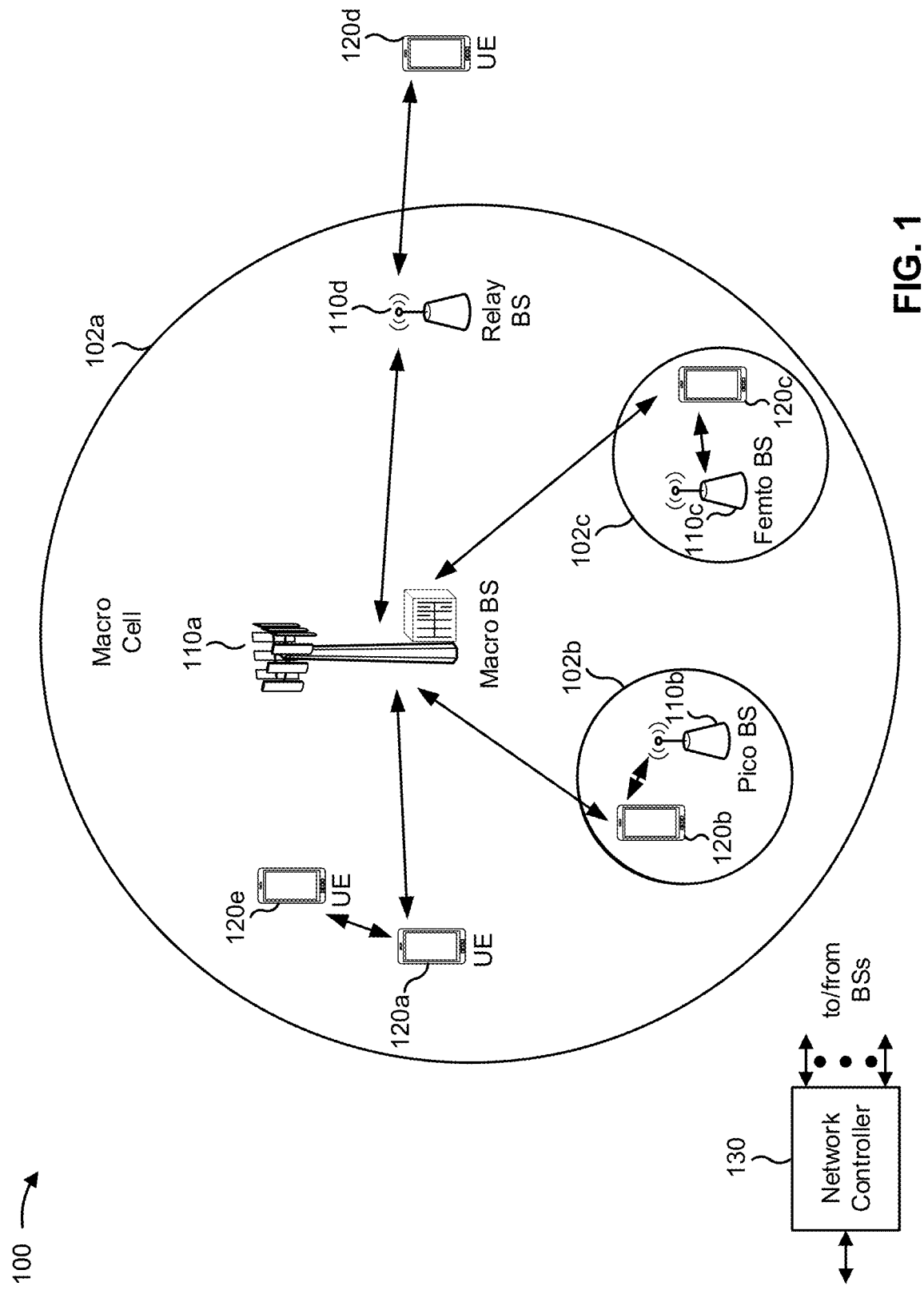
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
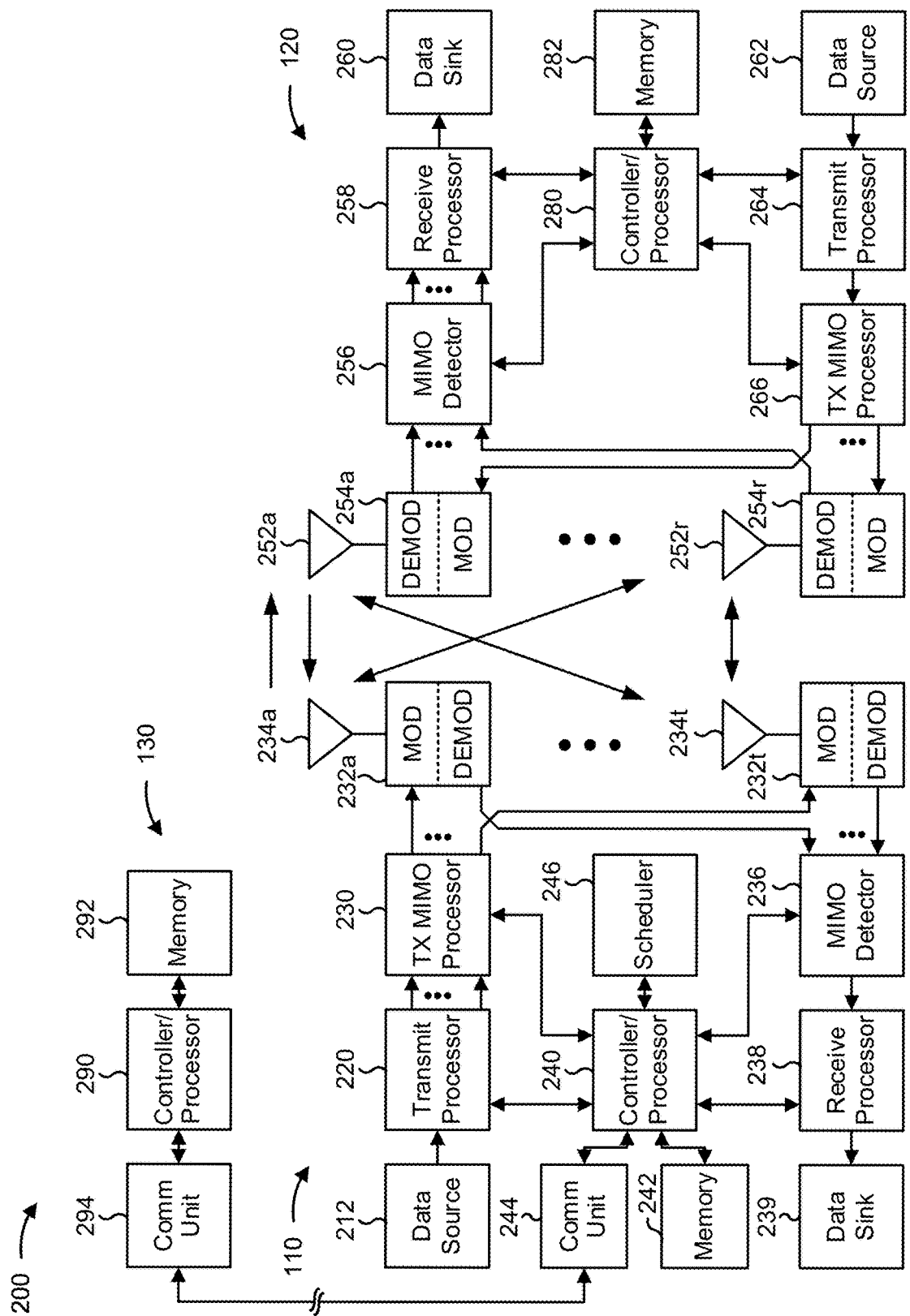
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reference signal transmission using a reference signal design for cellular broadcast, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for determining a set of resources, in a set of physical multicast channel symbols between a first cell acquisition subframe and a second cell acquisition subframe, means for receiving a first type of reference signal and a second type of reference signal, means for receiving one or more reference signal transmissions in accordance with the set of resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a set of resources, in a set of physical multicast channel symbols between a first cell acquisition subframe and a second cell acquisition subframe, for transmitting a first type of reference signal and a second type of reference signal, means for receiving one or more reference signal transmissions in accordance with the set of resources, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
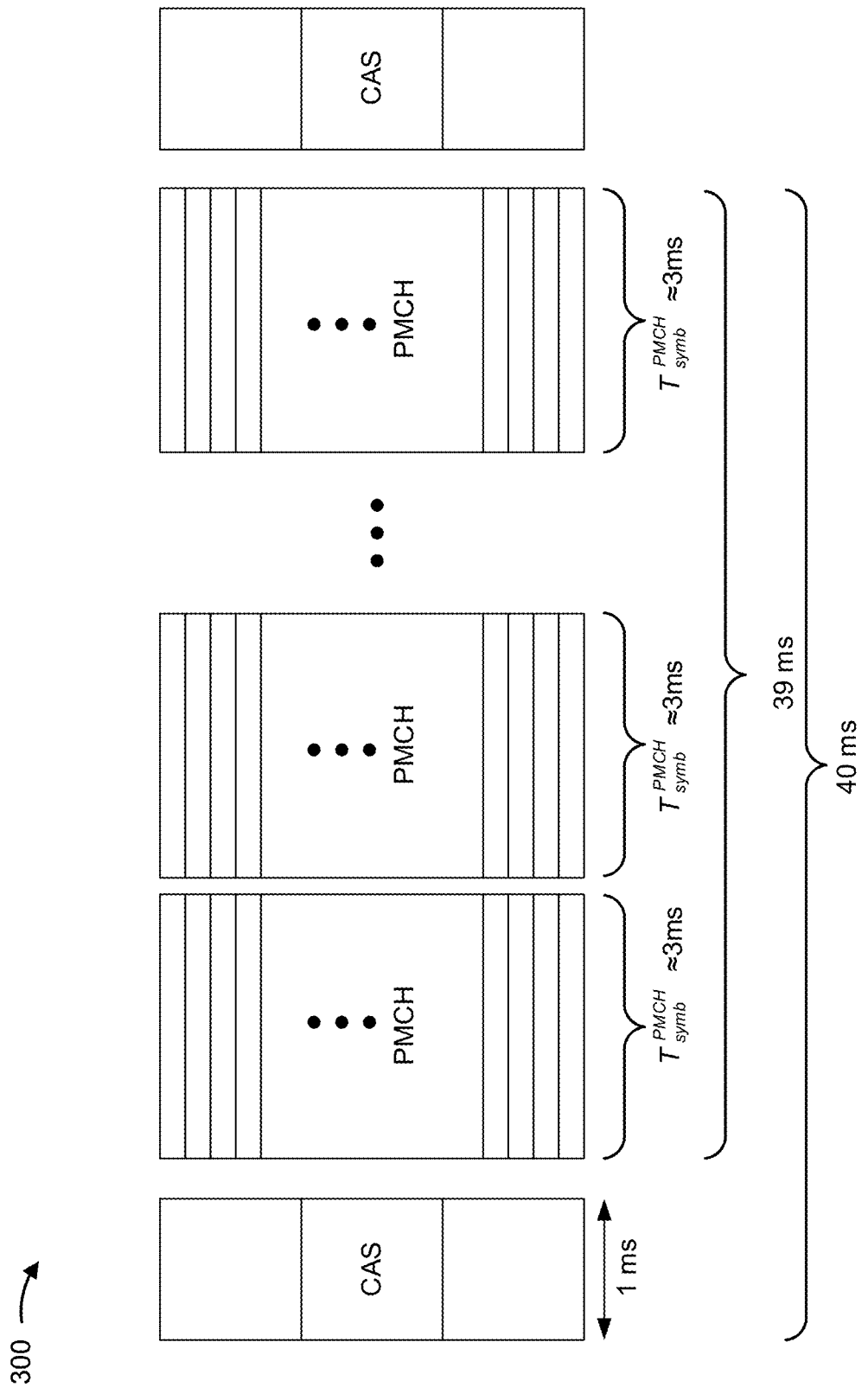
FIG. 3 is a block diagram conceptually illustrating a frame structure for cell acquisition subframes (CAS) and physical multicast channel (PMCH) symbols, in accordance with various aspects of the present disclosure.

FIG. 3 is a block diagram conceptually illustrating an example 300 of a frame structure that includes cell acquisition subframes (CASs) and physical multicast channel (PMCH) symbols, in accordance with various aspects of the present disclosure.

A communications system, such as a 5G cellular broadcast communication system, may include reception scenarios with a threshold inter-site distance. For example, a rooftop reception scenario may be associated with inter-site distances of greater than 1 kilometer (km), up to 150 km, and/or the like. Rooftop reception scenarios with a threshold inter-site distance may result in a threshold delay spread. A candidate numerology for such a scenario may be selected to have a threshold duration of a cyclic prefix to cover the threshold delay spread of a channel.

As shown in FIG. 3, example 300 shows CASs and PMCHs in a frame structure for, for example, a rooftop reception scenario. As shown, the frame structure includes a first CAS, a plurality of PMCH symbols, and a second CAS. A time from a start of the first CAS to a start of the second CAS may be 40 milliseconds (ms) and each CAS may have a duration of 1 ms. This results in a 39 ms spacing between the first CAS and the second CAS forming a PMCH region for PMCH symbols. In some aspects, the PMCH symbols may be between the first CAS and the second CAS, which may be consecutive CASs. In some aspects, PMCH symbols are interspersed by periodic occurrences of a CASs. In other words, a first portion of the PMCH symbols may be between a first CAS and a second CAS, a second portion of the PMCH symbols may be between the second CAS and a third CAS, and/or the like.

A first candidate numerology for the PMCH region (e.g., for a scenario with a threshold delay spread) includes a transmission time duration of 2400 microseconds (s) and a cyclic prefix duration of 386 s, which results in a symbol duration of 2786 s and a subcarrier spacing (SCS) of 416.67 hertz (Hz). As a result, in the first candidate numerology, 14 PMCH symbols occur in the PMCH region. Alternatively, a second candidate numerology for the PMCH region (e.g., for a scenario with a threshold delay spread) includes a transmission time duration of 2700 s and a cyclic prefix duration of 300 s, which results in a symbol duration of 3000 s and an SCS of 370.37 Hz. As a result, in the second candidate numerology, 13 PMCH symbols occur in the PMCH region.

As indicated above, FIG. 3 is provided as an example. Other examples may differ from what is described with respect to FIG. 3.

Some aspects described herein may provide a reference signal design and enable use of the reference signal design for a PMCH region for the candidate numerologies. In some aspects, the reference signal design for the candidate numerologies may be based at least in part on a joint time-frequency-plane design over a subset of subcarriers of PMCH symbols in the PMCH region. In some aspects, the reference signal design for the candidate numerologies may be associated with a threshold level of reference signal density (e.g., a threshold packing) to enable channel estimation. In some aspects, the reference signal design may enable correction of a residual carrier frequency offset (CFO).

Figure 4A:
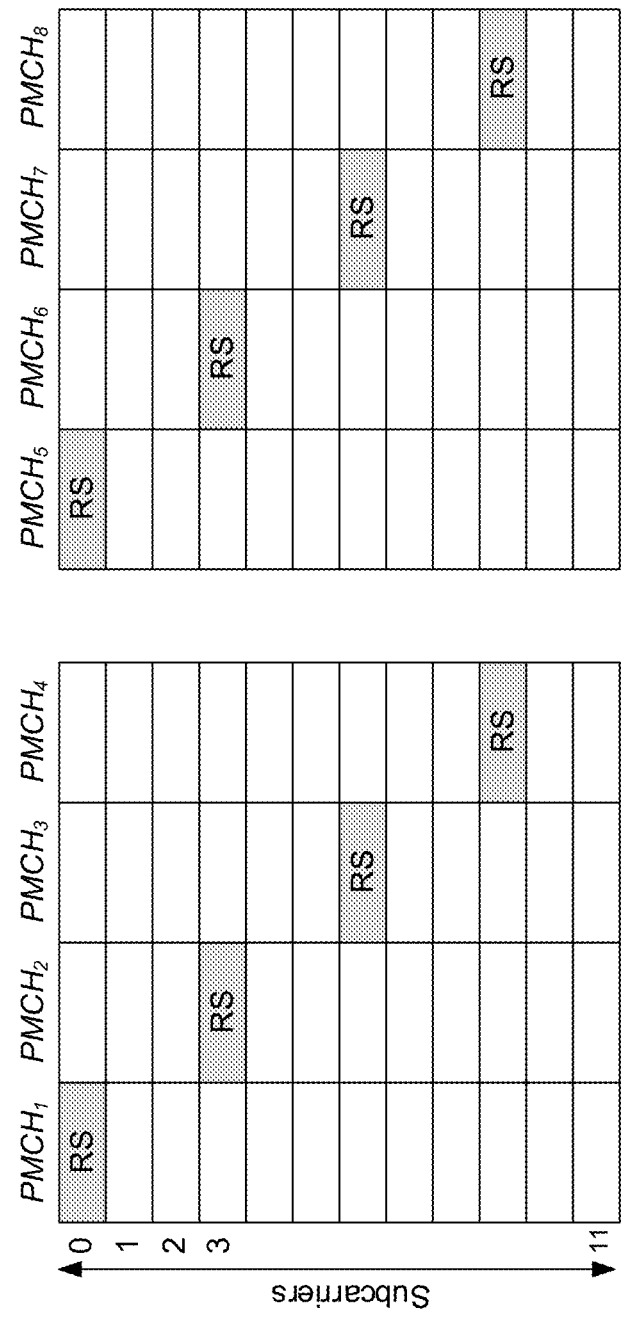
FIGS. 4A-4C are block diagrams conceptually illustrating reference signal transmission patterns for a single type of reference signal within an example frame structure, in accordance with various aspects of the present disclosure.
Figure 4B:
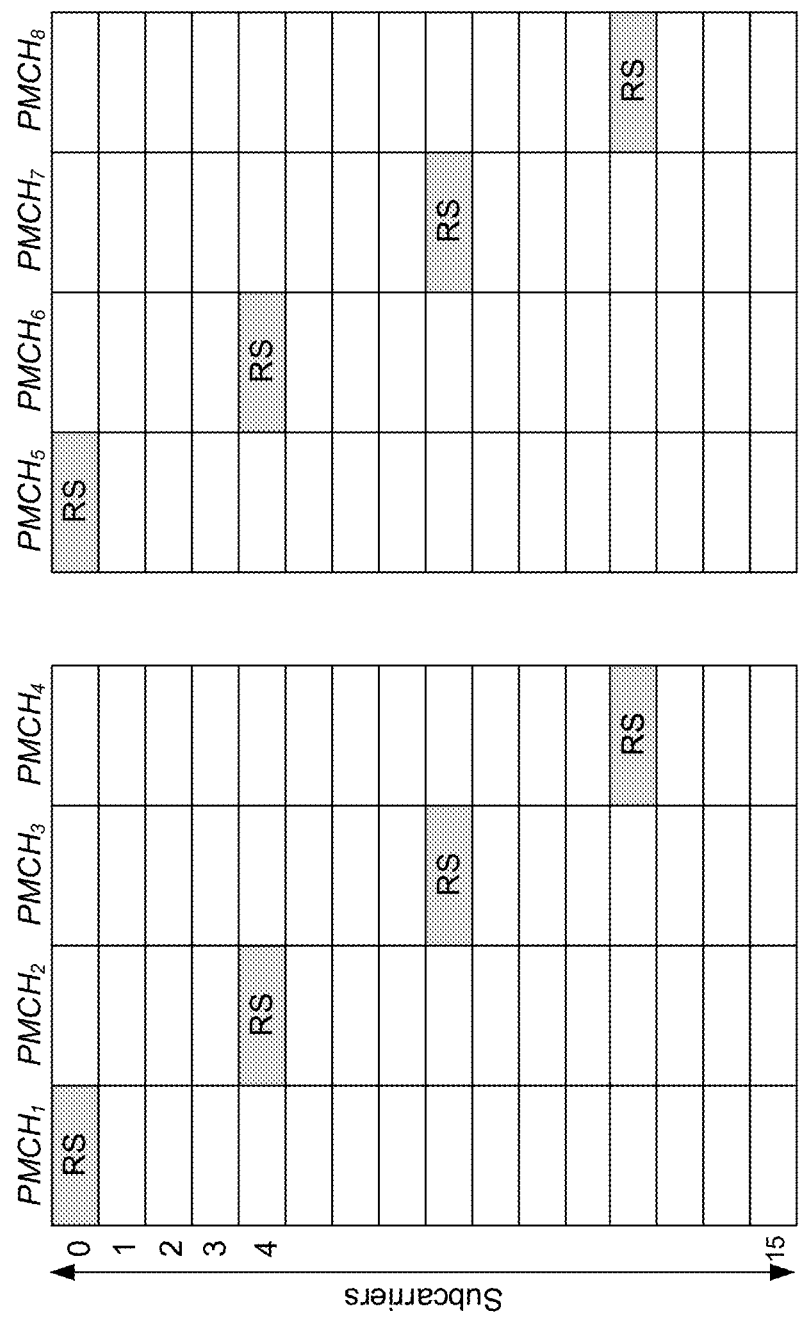
Figure 4C:
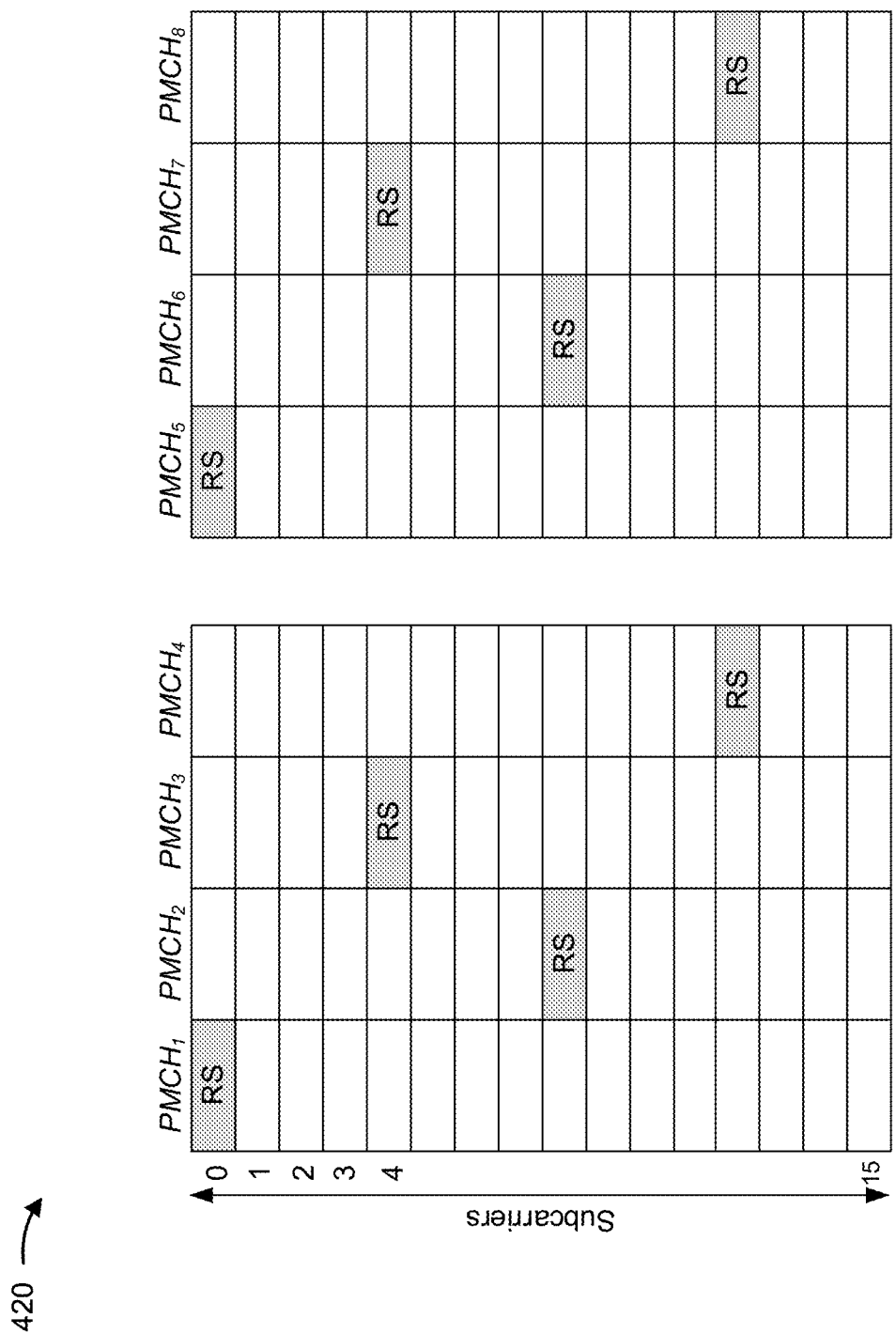

FIGS. 4A-4C are block diagrams conceptually illustrating examples 400/410/420 of reference signal transmission patterns for a single type of reference signal within an example frame structure, in accordance with various aspects of the present disclosure.

A UE (e.g., UE 120) and/or a BS (e.g., BS 110) may define a reference signal transmission pattern with respect to a frequency spacing, $F_d$, of subcarriers and a time stagger, $T_d$, of symbols. As shown in FIGS. 4A-4C, the reference signal transmission patterns result in a reference signal once in each $F_d*T_d$ subcarriers of a PMCH symbol configured with a value for $F_d$ and $T_d$. Across a group of $T_d$ PMCH symbols, a reference signal occurs once in each $F_d$ subcarrier collectively (e.g., when coalesced). Within each PMCH symbol, the reference signal subcarriers have a periodicity of $F_d*T_d$.

In some aspects, the time stagger may be based at least in part on a coherence time of a channel. For example, for a channel that changes relatively fast, a relatively small time stagger may be used. In contrast, for a channel that changes relatively slow, a relatively large time stagger may be used to enable channel estimation. In some aspects, the UE and/or the BS may store configuration information indicating the frequency spacing, the time stagger, and/or one or more other parameters for determining a resource for a reference signal, as described herein. In some aspects, the BS may dynamically configure and/or reconfigure resources for reference signal transmission.

As shown in FIG. 4A, example 400 includes a first reference signal transmission pattern. The first reference signal transmission pattern is associated with a frequency spacing of 3 and a time stagger of 4. As a result, a reference signal in PMCH symbol 1 (denoted $PMCH_1$) is in subcarrier 0, a reference signal in PMCH symbol 2 (denoted $PMCH_2$) is in subcarrier 3, and/or the like based at least in part on a frequency spacing of 3. Similarly, a reference signal is, again, in subcarrier 0 in PMCH symbol 5 (denoted $PMCH_5$) based at least in part on a time stagger of 4. In some aspects, the BS and/or the UE may store information identifying the first reference signal pattern, such as a mapping of resources in PMCH symbols. Additionally, or alternatively, the BS and/or the UE may dynamically determine the first reference signal pattern (and/or one or more other reference signal patterns described herein) based at least in part on an equation, as described in more detail herein.

As shown in FIG. 4B, example 410 includes a second reference signal transmission pattern. The second reference signal transmission pattern is associated with a frequency spacing of 4 and a time stagger of 4. As a result, a reference signal in PMCH symbol 1 is in subcarrier 0, a reference signal in PMCH symbol 2 is in subcarrier 4, and/or the like based at least in part on a frequency spacing of 3. Similarly, a reference signal is, again, in subcarrier 0 in PMCH symbol 5 based at least in part on a time stagger of 4. In this case, the second reference signal transmission pattern may be termed a monotonic reference signal transmission pattern.

As shown in FIG. 4C, example 420 includes a third reference signal transmission pattern. The third reference signal transmission pattern is associated with a frequency spacing of 4 and a time stagger of 4, but is a non-monotonic reference signal transmission pattern. As a result, a reference signal in PMCH symbol 1 is in subcarrier 0; a reference signal in PMCH symbol 2 is in subcarrier 8; a reference signal in PMCH 3 is in subcarrier 4; and a reference signal in PMCH symbol 4 is in subcarrier 12. In other words, in the non-monotonic reference signal transmission pattern, the time stagger pattern is non-sequential with regard to the offset from subcarrier 0 across sequential PMCH symbols.

As indicated above, FIGS. 4A-4C are provided as examples. Other examples may differ from what is described with respect to FIGS. 4A-4C.

In examples 400/410/420, after initial downlink synchronization and physical broadcast channel (PBCH) acquisition, a residual CFO may be correctable using reference signals and/or phase-locked loops (PLLs). For example, with a time stagger of $T_d$, a PLL may be used to correct a residual CFO of up to $1/(2*T_d*T_{symb})$ where $T_{symb}$ represents the symbol duration (e.g., 2786 s for the first candidate numerology and 3000 s for the second candidate numerology). For the first candidate numerology, using a PLL, a UE may correct up to 44.87 Hz of residual CFO. Similarly, for the second candidate numerology, using a PLL the UE may correct up to 41.67 Hz of residual CFO. However, the residual CFO for some scenarios, may be approximately 100 Hz.

Some aspects described herein provide a second type of reference signal to enable residual CFO compensation for scenarios where a large channel coherence time results in a larger time-stagger parameter $T_d$ of the first type of reference signal to improve reference signal overhead. For example, a UE may receive a first type of reference signal for channel estimation and a second type of reference signal for channel estimation and CFO correction in scenarios with greater than a threshold residual CFO (e.g., greater than is correctable using only the first type of reference signal). In this case, the second type of reference signal may be a sparse reference signal that occurs in the same subcarrier(s) of every PMCH symbol to correct residual CFOs.

In some aspects, the second type of reference signal may be defined as sparse in the frequency domain based at least in part on occurring once in each physical resource block (PRB) (e.g., with a frequency of 180 kHz). In some aspects, the second type of reference signal may be defined as sparse in the frequency domain based at least in part on occurring once in a bandwidth of a PMCH symbol, as described herein.

In some aspects, a BS may scramble and a UE may de-scramble the plurality of types of reference signals. For example, the BS may scramble the plurality of types of reference signals based at least in part on an identifier corresponding to a multicast-broadcast single-frequency number (MBSFN) area identifier. In some aspects, the plurality of types of reference signals may be jointly scrambled using the same reference signal scrambling pattern. Additionally, or alternatively, the plurality of types of reference signals may be scrambled using different scrambling patterns for each type of reference signal.

In some aspects, the BS and/or the UE may determine reference signal resources (e.g., reference signal locations within available resources) based at least in part on one or more equations. For example, a reference signal location (e.g., for the first type of reference signal) may be specified as a vertical shift v with respect to a particular subcarrier of a PMCH symbol and may be based at least in part on a periodicity in a subcarrier domain for the PMCH symbol. In this case, a UE may determine the reference signal as a function of the vertical shift, which may be based at least in part on a system frame number (SFN), an orthogonal frequency division multiplexing (OFDM) symbol index for the PMCH symbol with respect to an immediately previous CAS, a time stagger parameter, a frequency offset, a quantity of PMCH symbols that occur between two consecutive CASs in the PMCH region, a multicast-broadcast single-frequency network (MBSFN) area identifier, an MBSFN cell identifier, and/or the like.

As an example, a UE and/or a BS may determine v based at least in part on an equation of the form:

$$v = F_d \times \left( \left( \text{mod}\left( \left\lfloor \frac{SFN}{4} \right\rfloor \times N_{PMCH}^{CAS} + n_{symb} \right), T_d \right) \right)$$

where $N_{PMCH}^{CAS}$ represents a quantity of symbols in the PMCH region between two consecutive CASs (e.g., which may be based at least in part on whether the first candidate numerology or the second candidate numerology is used) and $n_{symb}$ represents a PMCH symbol index within the PMCH region between two consecutive CASs (e.g., from 0 to N−1). In this way, the UE and/or the BS determines the vertical shift in the subcarrier domain, with respect to a reference subcarrier (e.g., subcarrier 0) for a monotonic uniform reference signal transmission pattern, such as is illustrated by examples 400 and 410 and by a first type of reference signal in example 500, as described in more detail herein. In some aspects, a vertical shift for a type-1 MBSFN reference signal pattern may be included in an equation for a reference-signal sequence mapping to a complex-valued modulation symbol of the form:

$$k = \begin{cases} 12\left(m' - \left\lfloor \frac{N_{sc}^{RB}}{12} \right\rfloor \Delta \right) + 3(\tilde{n}_s \bmod 4) & \text{if } \tilde{n}_s \bmod 4 \in \{0,1\} \\ 12\left(m' - \left\lceil \frac{N_{sc}^{RB}}{12} \right\rceil \Delta \right) + 3(\tilde{n}_s \bmod 4) & \text{if } \tilde{n}_s \bmod 4 \in \{2,3\} \end{cases}$$

where $\tilde{n}_s$ represents an absolute slot number and the '$3(\tilde{n}_s \bmod 4)$' term represents a vertical shift. Similarly, for a type-2 MSFN reference signal pattern the equation may be of the form:

$$k = 6\left(m' - \frac{N_{sc}^{RB}}{6}\Delta\right) + 3(\tilde{n}_s \bmod 2)$$

where '$3(\tilde{n}_s \bmod 2)$' represents the vertical shift. Expanding out the '$3(\tilde{n}_s \bmod 4)$' term, results in an equation of the form (for $F_d$=3 and $T_d$=4 or 2):

$$F_d \times \left( \left( n_s + 13 \left\lfloor \frac{n_f}{4} \right\rfloor \right) \bmod T_d \right) = 3(\tilde{n}_s \bmod 4)$$

where $n_s$ is a symbol index of the symbols within the two CASs (with a quantity of symbols between the CASs of 13).

Additionally, or alternatively, for a non-monotonic uniform reference signal transmission pattern, as is illustrated by example 420, the UE and/or the BS may determine v as:

$$v = F_d \times \left( \Pi_{T_d, SFN, N_{PMcH}^{CAS}} \left( \text{mod}\left( \left\lfloor \frac{SFN}{4} \right\rfloor \times N_{PMCH}^{CAS} + n_{symb} \right), T_d \right) \right)$$

where $\Pi_{T_d, SFN, N_{PMSCH}^{CAS}}$ represents a permutation from $\{1, 2, \ldots, T_d\} \rightarrow \{1, 2, \ldots, T_d\}$ that is based at least in part on a non-monotonic pattern that may be based at least in part on at least one of SFN or $N_{PMCH}^{CAS}$.

Additionally, or alternatively, the UE and/or the BS may determine v using a piecewise equation. For example, the UE and/or the BS may determine v using a first equation for $n_{symb}=\{0, 1\}$ and a second equation for $n_{symb}=\{2, 3, \ldots, 13\}$, which may enable determination of a non-uniform reference signal transmission pattern (e.g., a reference signal transmission pattern with a plurality of sub-patterns) for the first type of reference signal illustrated by examples 510 and 520, as described herein.

When the shift is based at least in part on the MBSFN area identifier or MBSFN cell identifier, a $v_{shift}$ parameter may be introduced for determining the reference signal transmission pattern. In this case, a composite shift may be represented as:

$$S = \text{mod}((v+v_{shift}), (F_d \times T_d))$$

where $v_{shift}$ is based at least in part on the MBSFN area identifier or MBSFN cell identifier. As a result, the UE and/or the BS may determine subcarrier indices k in a PMCH symbol for the first type of reference signal as:

$$k_{Type_1}(SFN, n_{symb}) = (F_d \times T_d) \times m + \text{mod}((v + v_{shift}), (F_d \times T_d)),$$

$$\text{where } m \in \left\{0, 1, \ldots, \frac{N_{SC}^{PMCH}}{F_d \times T_d}\right\}$$

where $N_{SC}^{PMCH}$ represents a quantity of subcarriers for PMCH transmission.

In some aspects, when the UE and the BS are to determine a reference signal transmission pattern that includes a second type of reference signal, the UE and the BS may determine another set of subcarrier indices k for the second type of reference signal. In this case, as described herein, subcarrier indices for the second type of reference signal may be the same for each PMCH symbol, and a subcarrier location for the second type of reference signal may be based at least in part on the MBSFN area identifier or the MBSFN cell identifier. For example, when the second type of reference signal is to occur once in each PRB, as described above, the UE and/or the BS may determine subcarrier indices (which are the same for each PMCH symbol in an MBSFN area) as:

$$k_{Type_2} = N_{SC}^{PRB} \times m' + \text{mod}(v'_{shift}, N_{SC}^{PRB})$$

where $v'_{shift}$ is based at least in part on the MBSFN area identifier and $N_{SC}^{PRB}$ represents a quantity of subcarriers in a PRB (e.g., which may be based at least in part on which of the candidate numerologies is used).

Figure 5A:
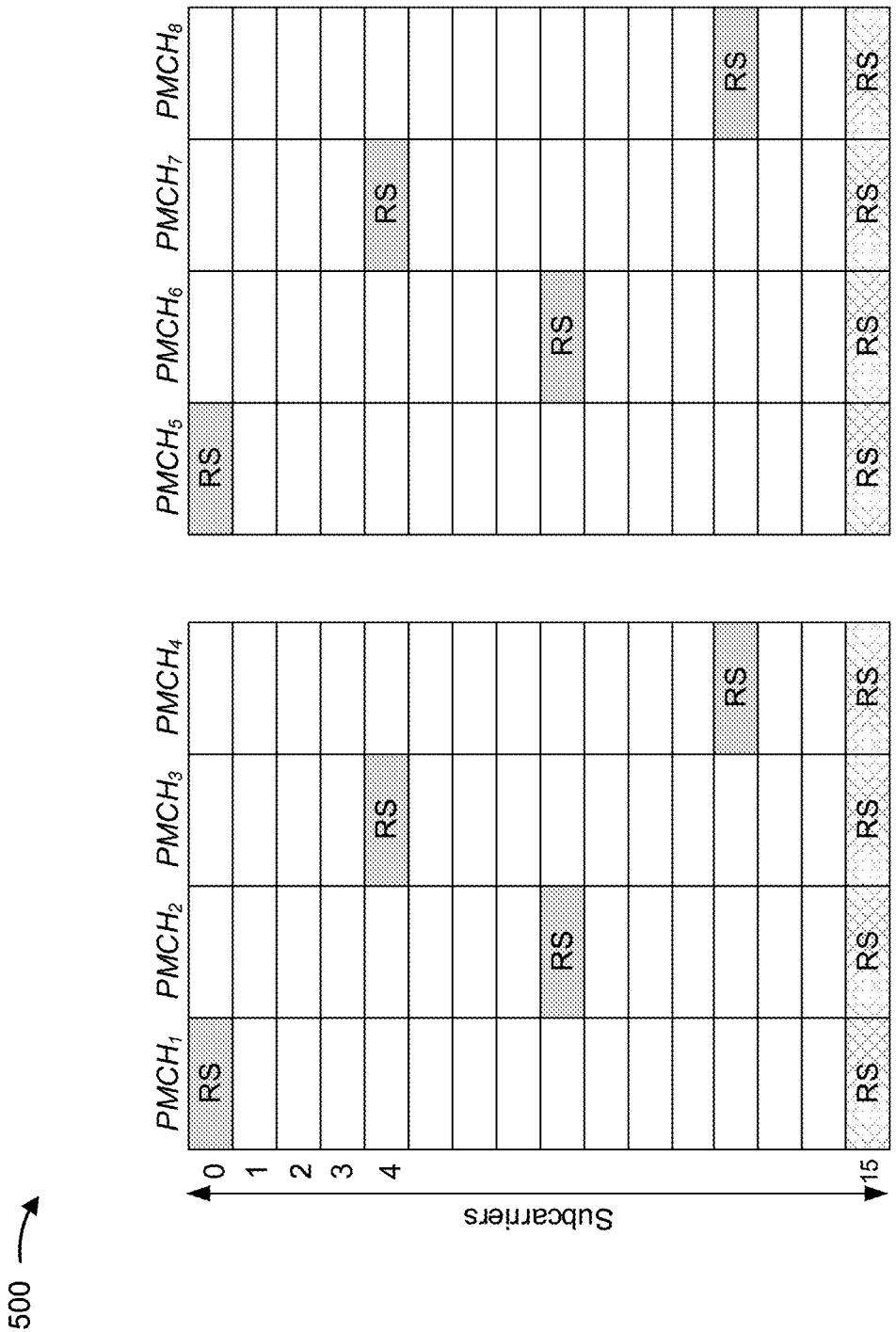
FIGS. 5A-5C are block diagrams conceptually illustrating reference signal transmission patterns for a plurality of types of reference signals within an example frame structure, in accordance with various aspects of the present disclosure.
Figure 5B:
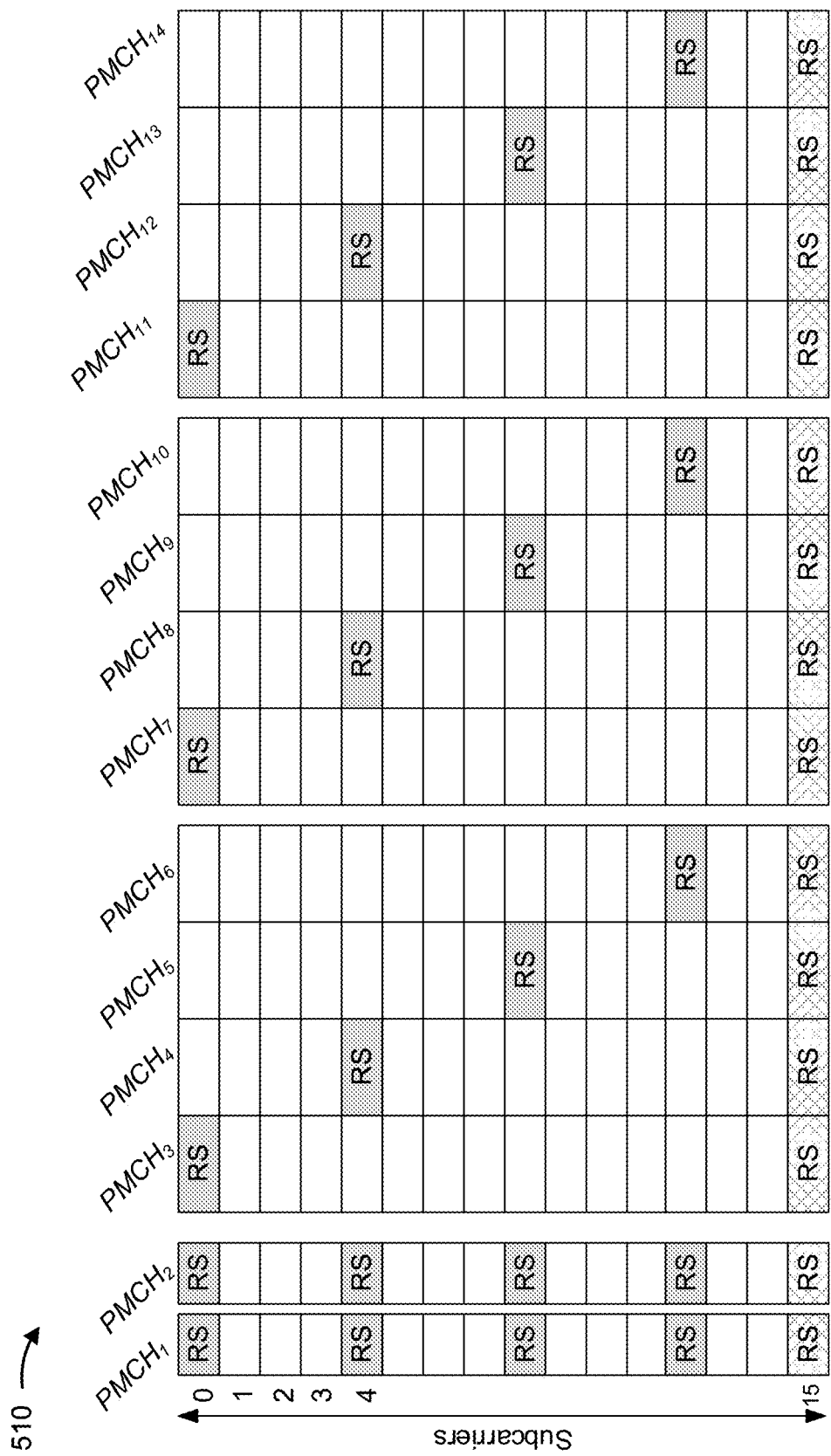
Figure 5C:
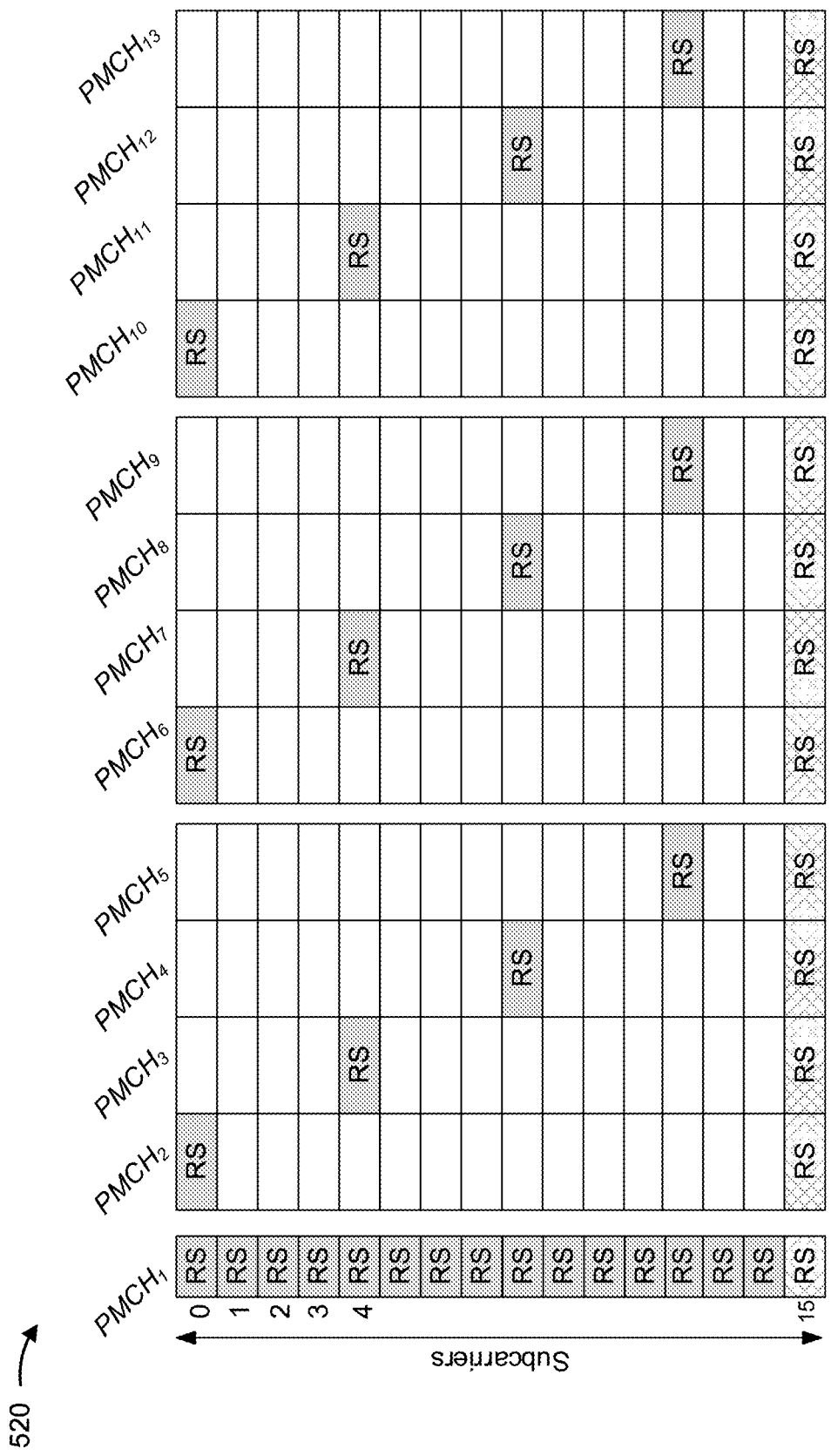

FIGS. 5A-5C are block diagrams conceptually illustrating examples 500/510/520 of reference signal transmission patterns for a single type of reference signal within an example frame structure, in accordance with various aspects of the present disclosure.

As shown in FIG. 5A, example 500 includes a fourth reference signal transmission pattern. The fourth reference signal transmission pattern is associated with a frequency spacing of 4 and a time stagger of 4 and an additional type of reference signal for CFO correction. As a result, a first occurrence (e.g., a first resource) of a first type of reference signal in PMCH symbol 1 is in subcarrier 0, a second occurrence (e.g., a second resource) of the first type of reference signal in PMCH symbol 2 is in subcarrier 4, and/or the like. Here, a second type of reference signal is associated with a frequency spacing of 0 and a time stagger of 1. As a result, occurrences of the second type of reference signal (e.g., resources for the second type of reference signal) are in a subcarrier 15 of each PMCH, thereby enabling correction of a residual CFO of approximately 100 Hz.

As shown in FIG. 5B, example 510 includes a fifth reference signal transmission pattern that includes a plurality of sub-patterns for the first candidate numerology. For example, the fifth reference signal transmission pattern includes, for a first type of reference signal, a frequency spacing of 4 and a time stagger of 1 for PMCH symbols 1 and 2 and a frequency spacing of 4 and a time stagger of 4 for PMCH symbols 3 to 14. This may reduce an amount of initial buffering of data that may occur before PMCH decoding is complete. In this case, the second type of reference signal is associated with a frequency spacing of 0 and a time stagger of 1, resulting in the second type of reference signal occurring in each PMCH at the same subcarrier.

As shown in FIG. 5C, example 520 includes a sixth reference signal transmission pattern that includes a plurality of sub-patterns for the second numerology. For example, the sixth reference signal transmission pattern includes, for a first type of reference signal, a frequency spacing of 4 and a time stagger of 1 for PMCH symbol 1 and a frequency spacing of 4 and a time stagger of 4 for PMCH symbols 2 to 13. In this case, the first PMCH symbol is a densely packed symbol (e.g., the first PMCH symbol includes greater than a threshold quantity of reference signals), which may improve channel estimation relative to other reference signal patterns. Furthermore, the sixth reference signal transmission pattern may reduce an amount of initial buffering of data that may occur before PMCH decoding is complete. In this case, the second type of reference signal is associated with a frequency spacing of 0 and a time stagger of 1, resulting in the second type of reference signal occurring in each PMCH at the same subcarrier.

In some aspects, a BS may signal, to a UE, dense packing of reference signals in the first PMCH symbol. For example, the BS may transmit a system information block (SIB) message, a downlink control information (DCI) message, and/or the like to cause the UE to omit one or more PMCH symbols from a reference signal mapping equation described above, and to use a dense packing configuration for the one or more PMCH symbols. In some aspects, the BS may override a reference signal mapping equation for one or more other PMCH symbols using a SIB message, a DCI message, and/or the like, thereby enabling dynamic configuration of the reference signal transmission patterns, values for the frequency offset and/or the time stagger, and/or the like.

In some aspects, the BS may configure a particular transport block size (TBS) for the PMCH symbols. For example, the BS may configure a relatively small TBS for the densely packed first PMCH symbol and a relatively large TBS for other sparsely packed PMCH symbols. In this case, the BS may transmit an indication of a scaling factor for scaling TBSs based at least in part on a quantity of reference signals for which resources are allocated in a PMCH symbol.

As indicated above, FIGS. 5A-5C are provided as examples. Other examples may differ from what is described with respect to FIGS. 5A-5C.

Figure 6:
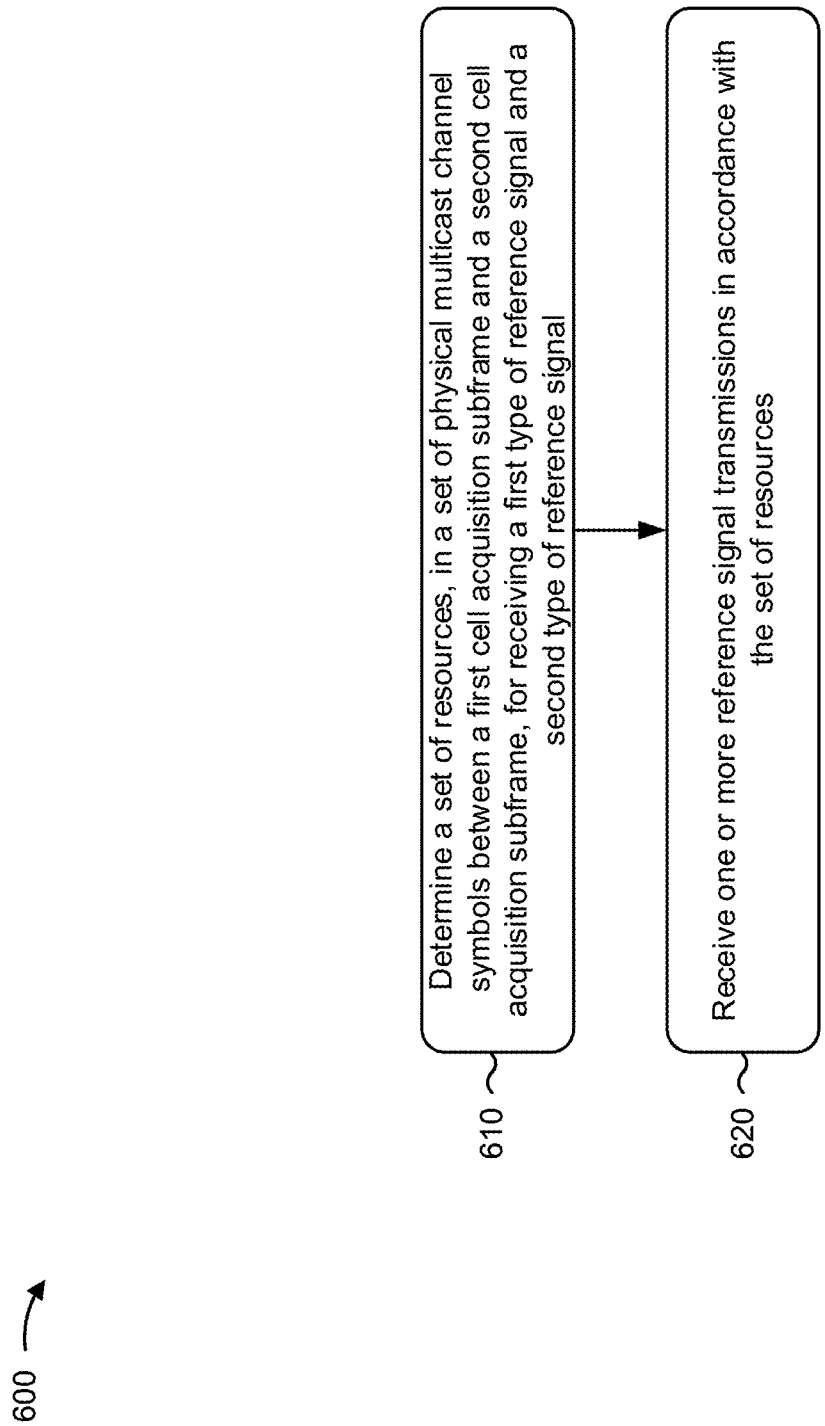
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with reference signal design for numerologies.

As shown in FIG. 6, in some aspects, process 600 may include determining a set of resources, in a set of physical multicast channel symbols between a first cell acquisition subframe and a second cell acquisition subframe, for receiving a first type of reference signal and a second type of reference signal (block 610). For example, the UE (e.g., using receive processor 258, transmit processor 264, controller/processor 280, memory 282, and/or the like) may determine a set of resources, in a set of physical multicast channel symbols between a first cell acquisition subframe and a second cell acquisition subframe, for receiving a first type of reference signal and a second type of reference signal, as described above. In some aspects, the first type of reference signal is for channel estimation, and the second type of reference signal is for channel estimation and carrier frequency offset estimation.

As further shown in FIG. 6, in some aspects, process 600 may include receiving one or more reference signal transmissions in accordance with the set of resources (block 620). For example, the UE (e.g., using receive processor 258, transmit processor 264, controller/processor 280, memory 282, and/or the like) may receive one or more reference signal transmissions in accordance with the set of resources, as described above.

Process 600 may include additional aspects, such as any single aspect or any combination of aspects described below and/or in connection with one or more other processes described elsewhere herein.

In a first aspect, the first type of reference signal is associated with a subset of the set of resources defined based at least in part on a frequency spacing pattern of subcarriers and a time stagger pattern across symbols.

In a second aspect, alone or in combination with the first aspect, the frequency spacing pattern forms a monotonic pattern.

In a third aspect, alone or in combination with one or more of the first and second aspects, the frequency spacing pattern forms a non-monotonic pattern.

In a fourth aspect, alone or in combination with one or more of the first through third aspects, the second type of reference signal is associated with a sparse subset of the set of resources in a frequency domain.

In a fifth aspect, alone or in combination with one or more of the first through fourth aspects, the sparse subset of the set of resources in the frequency domain is defined by a single resource in each physical resource block in the same frequency location of each physical multicast channel symbol of the set of physical multicast channel symbols.

In a sixth aspect, alone or in combination with one or more of the first through fifth aspects, the sparse subset of the set of resources is defined by a single resource in the same frequency location of each physical multicast channel symbol of the set of physical multicast channel symbols.

In a seventh aspect, alone or in combination with one or more of the first through sixth aspects, a first subset of the set of physical multicast channel symbols have first resources, of the set of resources, with a first frequency spacing and a first time stagger, and a second subset of the set of physical multicast channel symbols have second resources, of the set of resources, with a second frequency spacing and a second time stagger, and the first frequency spacing is different from the second frequency spacing, the first time stagger is different from the second time stagger, or the first frequency spacing is different from the second frequency spacing and the first time stagger is different from the second time stagger.

In an eighth aspect, alone or in combination with one or more of the first through seventh aspects, the first resources are packed more densely in the first subset than the second resources are packed in the second subset.

In a ninth aspect, alone or in combination with one or more of the first through eighth aspects, one or more resources, of the set of resources, in each physical multicast channel symbol, of the set of physical multicast channel symbols, are defined based at least in part on a vertical shift parameter corresponding to a shift relative to an initial subcarrier.

In a tenth aspect, alone or in combination with one or more of the first through ninth aspects, the vertical shift parameter is based at least in part on at least one of: a system frame number, an orthogonal frequency division multiplexing symbol index, a time stagger parameter, a frequency shift parameter, a numerology, a multicast-broadcast single-frequency network area identifier, a multicast-broadcast single-frequency network cell identifier, or a quantity of physical multicast channel symbols occurring between two consecutive cell acquisition subframes.

In an eleventh aspect, alone or in combination with one or more of the first through tenth aspects, the first type of reference signal and the second type of reference signal are scrambled based at least in part on a multicast-broadcast single-frequency network area identifier.

In a twelfth aspect, alone or in combination with one or more of the first through eleventh aspects, the first type of reference signal is scrambled with a first scrambling parameter and the second type of reference signal is scrambled with a second scrambling parameter that is different from the first scrambling parameter.

In a thirteenth aspect, alone or in combination with one or more of the first through twelfth aspects, the first type of reference signal and the second type of reference signal are jointly scrambled.

In a fourteenth aspect, alone or in combination with one or more of the first through thirteenth aspects, a subset of the set of resources may be determined based at least in part on a system information block or downlink control information message.

In a fifteenth aspect, alone or in combination with one or more of the first through fourteenth aspects, the system information block or downlink control information message indicates a dense demodulation reference signal usage.

In a sixteenth aspect, alone or in combination with one or more of the first through fifteenth aspects, a transport block size is based at least in part on a reference signal density in connection with the set of resources.

In a seventeenth aspect, alone or in combination with one or more of the first through sixteenth aspects, the second type of reference signal occurs in the same frequency location in each physical multicast channel symbol of the set of physical multicast channel symbol.

In an eighteenth aspect, alone or in combination with one or more of the first through seventeenth aspects, the set of physical multicast symbols is between two consecutive cell channel acquisition subframes.

In a nineteenth aspect, alone or in combination with one or more of the first through eighteenth aspects, each physical multicast channel symbol, of the set of physical multicast channel symbols, includes at least one reference signal resource for the second type of reference signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

As used herein, "approximately" may, depending on the context refer to a value that is within a threshold amount of a stated value, such as within 1%, within 10%, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
    determining a set of resources, in a set of physical multicast channel symbols between a first cell acquisition subframe and a second cell acquisition subframe, for receiving a first type of reference signal for channel estimation,
        wherein one or more resources, of the set of resources, corresponding to the first type of reference signal and in each physical multicast channel symbol, of the set of physical multicast channel symbols, are defined based at least in part on a vertical shift parameter based at least in part on:
            a system frame number,
            an orthogonal frequency division multiplexing symbol index,
            a time stagger parameter, and
            a quantity of physical multicast channel symbols occurring between the first cell acquisition subframe and the second cell acquisition subframe; and
    receiving one or more reference signal transmissions in accordance with the set of resources.

2. The method of claim 1, wherein the one or more resources are defined based at least in part on a frequency spacing pattern of subcarriers and a time stagger pattern across symbols.

3. The method of claim 2, wherein the frequency spacing pattern forms a monotonic pattern.

4. The method of claim 2, wherein the frequency spacing pattern forms a non-monotonic pattern.

5. The method of claim 1, wherein
    a first subset of the set of physical multicast channel symbols have one or more first resources, of the one or more resources, with a first frequency spacing and a first time stagger, and
    a second subset of the set of physical multicast channel symbols have one or more second resources, of the one or more resources, with a second frequency spacing and a second time stagger.

6. The method of claim 5, wherein the first resources are packed more densely in the first subset than the second resources are packed in the second subset.

7. The method of claim 1, wherein the vertical shift parameter corresponds to a shift relative to an initial subcarrier.

8. The method of claim 1, wherein a subset of the set of resources may be determined based at least in part on a system information block or downlink control information message.

9. The method of claim 8, wherein the system information block or downlink control information message indicates a dense demodulation reference signal usage.

10. The method of claim 1, wherein a transport block size is based at least in part on a reference signal density in connection with the set of resources.

11. The method of claim 1, wherein the first cell acquisition subframe and the second cell acquisition subframe are two consecutive cell channel acquisition subframes.

12. The method of claim 1, wherein the vertical shift parameter is further based at least in part on a numerology.

13. A user equipment (UE) for wireless communication, comprising:
    a memory; and
    one or more processors coupled to the memory, the one or more processors configured to:
        determine a set of resources, in a set of physical multicast channel symbols between a first cell acquisition subframe and a second cell acquisition subframe, for receiving a first type of reference signal,
            wherein one or more resources, of the set of resources and corresponding to the first type of reference signal and in each physical multicast channel symbol, of the set of physical multicast channel symbols, are defined based at least in part on a vertical shift parameter based at least in part on:
                a system frame number,
                an orthogonal frequency division multiplexing symbol index,
                a time stagger parameter, and
                a quantity of physical multicast channel symbols occurring between the first cell acquisition subframe and the second cell acquisition subframe; and
        receive one or more reference signal transmissions in accordance with the set of resources.

14. The UE of claim 13, wherein the one or more resources are defined based at least in part on a frequency spacing pattern of subcarriers and a time stagger pattern across symbols.

15. The UE of claim 14, wherein the frequency spacing pattern forms a monotonic pattern.

16. The UE of claim 13, wherein the vertical shift parameter corresponds to a shift relative to an initial subcarrier.

17. The UE of claim 13, wherein the vertical shift parameter is further based at least in part on a numerology.

18. The UE of claim 13, wherein:
    a first subset of the set of physical multicast channel symbols have one or more first resources, of the one or more resources, with a first frequency spacing and a first time stagger, and
    a second subset of the set of physical multicast channel symbols have one or more second resources, of the one or more resources, with a second frequency spacing and a second time stagger.

19. The UE of claim 13, wherein a subset of the set of resources may be determined based at least in part on a system information block or downlink control information message.

20. The UE of claim 13, wherein the first cell acquisition subframe and the second cell acquisition subframe are two consecutive cell channel acquisition subframes.

21. A method of wireless communication performed by a network entity, comprising:
    determining a set of resources, in a set of physical multicast channel symbols between a first cell acquisition subframe and a second cell acquisition subframe, for receiving a first type of reference signal for channel estimation,
        wherein one or more resources, of the set of resources, corresponding to the first type of reference signal and in each physical multicast channel symbol, of the set of physical multicast channel symbols, are defined based at least in part on a vertical shift parameter based at least in part on:
a system frame number,
an orthogonal frequency division multiplexing symbol index,
a time stagger parameter, and
a quantity of physical multicast channel symbols occurring between the first cell acquisition subframe and the second cell acquisition subframe; and
transmitting one or more reference signal transmissions in accordance with the set of resources.

22. The method of claim 21, wherein the vertical shift parameter corresponds to a shift relative to an initial subcarrier.

23. The method of claim 21, wherein the vertical shift parameter is further based at least in part on a numerology.

24. The method of claim 21, wherein the one or more resources are defined based at least in part on a frequency spacing pattern of subcarriers and a time stagger pattern across symbols.

25. The method of claim 21, wherein:
a first subset of the set of physical multicast channel symbols have one or more first resources, of the one or more resources, with a first frequency spacing and a first time stagger, and
a second subset of the set of physical multicast channel symbols have one or more second resources, of the one or more resources, with a second frequency spacing and a second time stagger.

26. A network entity for wireless communication, comprising:
a memory; and
one or more processors coupled to the memory, the one or more processors configured to:
determine a set of resources, in a set of physical multicast channel symbols between a first cell acquisition subframe and a second cell acquisition subframe, associated with a first type of reference signal for channel estimation,
wherein one or more resources, of the set of resources, corresponding to the first type of reference signal and in each physical multicast channel symbol, of the set of physical multicast channel symbols, are defined based at least in part on a vertical shift parameter based at least in part on:
a system frame number,
an orthogonal frequency division multiplexing symbol index,
a time stagger parameter, and
a quantity of physical multicast channel symbols occurring between the first cell acquisition subframe and the second cell acquisition subframe; and
transmit one or more reference signal transmissions in accordance with the set of resources.

27. The network entity of claim 26, wherein the vertical shift parameter corresponds to a shift relative to an initial subcarrier.

28. The network entity of claim 26, wherein the vertical shift is further based at least in part on a numerology.

29. The network entity of claim 26, wherein the one or more resources are defined based at least in part on a frequency spacing pattern of subcarriers and a time stagger pattern across symbols.

30. The network entity of claim 26, wherein:
a first subset of the set of physical multicast channel symbols have one or more first resources, of the one or more resources, with a first frequency spacing and a first time stagger, and
a second subset of the set of physical multicast channel symbols have one or more second resources, of the one or more resources, with a second frequency spacing and a second time stagger.

\* \* \* \* \*